United States Patent
Chandrasekaran et al.

(10) Patent No.: US 10,644,983 B2
(45) Date of Patent: May 5, 2020

(54) CONTROL PLANE ANALYTICS AND POLICING

(71) Applicant: Cisco Technology, Inc., San Jose, CA (US)

(72) Inventors: Varagur Chandrasekaran, Fremont, CA (US); Srinivas Pitta, Cupertino, CA (US); Ashok Ganesan, San Jose, CA (US); Naoshad Mehta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 41 days.

(21) Appl. No.: 15/662,309

(22) Filed: Jul. 28, 2017

(65) Prior Publication Data
US 2019/0036806 A1    Jan. 31, 2019

(51) Int. Cl.
| H04L 12/26 | (2006.01) |
| H04L 12/841 | (2013.01) |
| H04L 12/813 | (2013.01) |
| H04L 12/24 | (2006.01) |
| H04L 12/815 | (2013.01) |

(52) U.S. Cl.
CPC .......... H04L 43/18 (2013.01); H04L 41/0893 (2013.01); H04L 47/20 (2013.01); H04L 47/22 (2013.01); H04L 47/28 (2013.01); H04L 43/0894 (2013.01)

(58) Field of Classification Search
CPC .................................. H04L 43/18; H04L 47/20
See application file for complete search history.

(56) References Cited

U.S. PATENT DOCUMENTS

| 7,343,485 B1* | 3/2008 | Huang | H04L 63/0254 713/153 |
| 2002/0156886 A1* | 10/2002 | Krieski | H04L 12/2803 709/224 |
| 2002/0174216 A1* | 11/2002 | Shorey | H04L 43/00 709/224 |
| 2005/0210533 A1* | 9/2005 | Copeland | H04L 63/1416 726/23 |
| 2006/0233100 A1* | 10/2006 | Luft | H04L 41/0896 370/229 |
| 2008/0002595 A1* | 1/2008 | Rao | H04L 43/18 370/252 |
| 2009/0003366 A1* | 1/2009 | Chen | H04L 45/123 370/406 |
| 2009/0238192 A1* | 9/2009 | Dolganow | H04L 47/10 370/400 |
| 2013/0067109 A1* | 3/2013 | Dong | H04L 65/4069 709/231 |
| 2013/0258865 A1* | 10/2013 | Kovvali | H04W 24/10 370/241 |
| 2014/0293804 A1* | 10/2014 | Kakadia | H04L 41/145 370/252 |

* cited by examiner

*Primary Examiner* — Nicholas R Taylor
*Assistant Examiner* — Sanjoy K Roy
(74) *Attorney, Agent, or Firm* — Merchant & Gould P.C.

(57) ABSTRACT

Control plane analytics and policing may be provided. First, packets that traverse a port may be parsed. Next, based on the parsed packets, metrics for each of a plurality of hosts on a per-protocol basis may be created. The created metrics may then be analyzed and at least one restriction on at least one of the plurality of hosts may be applied based on the analysis.

20 Claims, 3 Drawing Sheets

US 10,644,983 B2

CONTROL PLANE ANALYTICS AND POLICING

TECHNICAL FIELD

The present disclosure relates generally to control plane analytics and policing.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet. Client address based forwarding of dynamic host configuration protocol response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
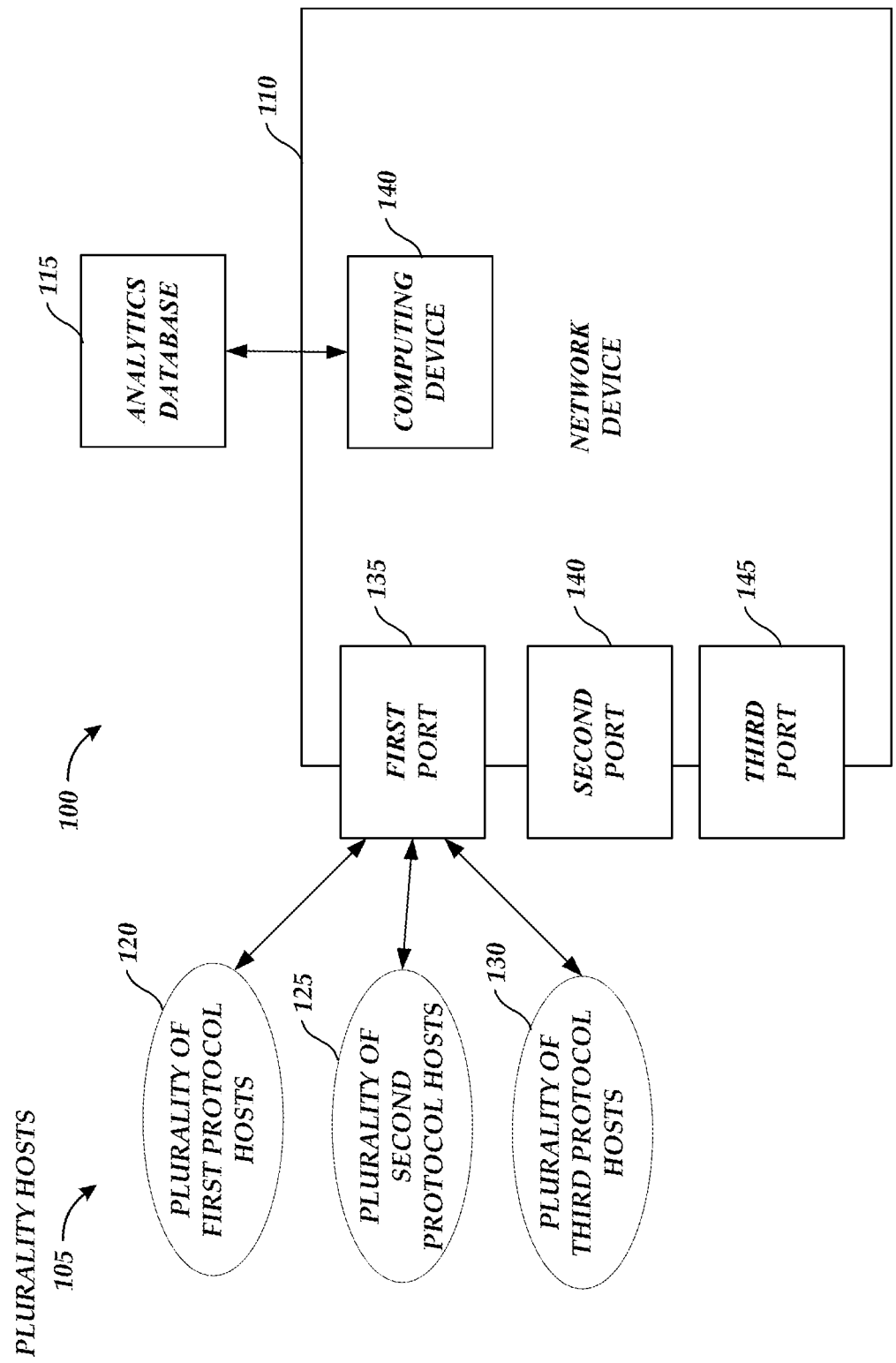
FIG. 1 shows a system for providing control plane analytics and policing.

Control plane analytics and policing may be provided. First, packets that traverse a port may be parsed. Next, based on the parsed packets, metrics for each of a plurality of hosts on a per-protocol basis may be created. The created metrics may then be analyzed and at least one restriction on at least one of the plurality of hosts may be applied based on the analysis.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Consistent with embodiments of the disclosure, switch inbuilt analytics may be provided on a control-plane in real-time. This may enable the control plane to be proactive to unusual network trigger events and protect, for example, the switch's central processing unit (CPU) bandwidth and other switch-level resources. Processes may be used to provide real-time control plane metrics on a collection of entities including, but not limited to: switch ports, control plane applications and protocols, and control plane application-hosts and protocol-peers. Embodiments of the disclosure may include systems and processes that may facilitate performing analytics in real-time without an external "data mining" server or external appliances for example.

Embodiments of the disclosure may perform control plane analytics in real time, may be quick in detecting changes in control plane characteristics, and may take proactive measures to handle these detected changes. For example, embodiments of the disclosure may generate a variety of control plane metrics within the switch itself. These metrics may be made available in external appliances that are placed in the path of the switch ports where control plane traffic is received or achieved via spanned-packets towards appliances.

In addition, embodiments of the disclosure may generate control plane metrics not just on Internet Protocol (IP) flows, but on a collection of entities, using all possible combinations of, for example, a five-tuple key that identify an IP-flow. The ability to generate control plane metrics on entities like protocols applications in real-time and the ability to publish generated control plane metrics in a flexible way using powerful key based filter criteria and metric based filter criteria may be provided.

Furthermore, embodiments of the disclosure may publish generated control plane metrics in the context of each record type entity in, for example, three possible modes: pull-based, timer-based-push, and event-based-push. Moreover, flexible queries like the following examples may be used: i) publish one or more control-plane-metrics on selective protocols periodically (e.g., every 10 seconds); ii) publish one or more control-plane-metrics on selective peers associated with a protocol periodically (e.g., every 10 seconds); iii) notify when Address Resolution Protocol (ARP) rate exceeds a certain limit from an IP peer; and iv) notify when traffic associated with a protocol exceeds a certain bandwidth.

Embodiments of the disclosure may also provide adaptive control plane protection policies. For example, control plane traffic at a switch port (i.e., both transmit and receive) may be directed to pass through an analytics engine on the switch. The analytics engine may build a database that involves "states" at each protocol level as well as at each host level within that protocol. One of the metrics that may be maintained in these states may comprise, for example, the frequency of handshakes in a given protocol (e.g., Address Resolution Protocol (ARP)) rate from any given host that is terminating on the switch. The number of states created and maintained by the analytics engine may be a function of how many hosts are communicating with the control plane of the switch and how many protocols are enabled in the switch.

Thresholds may be maintained for each of the protocol handshakes at each host level so that a given host's traffic behavior may be monitored in real-time. Accordingly, if a traffic storm is experienced by the switch from one or more of the hosts for example, this proactive monitoring may enable the control plane to install a more strict control plane protection policy dynamically for the specific host or hosts that may be causing the traffic storm. Embodiments of the disclosure are not limited to measuring protocol handshake rates and other characteristics of a given protocol and host may be monitored that can be captured and monitored in the respective states.

FIG. 1 shows a system 100 consistent with embodiments of the disclosure for providing control plane analytics and policing. As shown in FIG. 1, system 100 may comprise a plurality of hosts 105, a network device 110, and an analytics database 115. Plurality of hosts 105 may comprise, but are not limited to, a plurality of first protocol hosts 120, a plurality of second protocol hosts 125, and a plurality of third protocol hosts 130. Network device 110 may include, but is not limited to, a first port 135, a second port 140, a third port 145, and a computing device 140. While FIG. 1 shows analytics database 115 external to network device 110, analytics database 115 may be placed internal to network device 110.

Network device 110 may comprise, for example, a network switch, a router, or other type of computing or networking device disposed in a network, for example, the Internet. The network may comprise a plurality of network devices including, but not limited to, network device 110. Network device 110 may be disposed in a datacenter. First port 135, second port 140, and third port 145 may be used to send and receive data packets to and from network device 110.

Plurality of hosts 105 may connect to and communicate over the network through network device 110 by sending and receiving data packets through first port 135. Plurality of hosts 105 may comprise any number of hosts. Each of plurality of hosts 105 may comprise any type device wishing to communicate over the network through network device 110. For example, each of plurality of hosts 105 may comprise, but is not limited to, a Wi-Fi access point, a cellular base station, a tablet device, a mobile device, a smart phone, a telephone, a remote control device, a set-top box, a digital video recorder, a cable modem, a personal computer, a network computer, a mainframe, switch, a router, or other similar computing based device.

Plurality of first protocol hosts 120, plurality of second protocol hosts 125, and plurality of third protocol hosts 130 may communicate through network device 110 using a first protocol, a second protocol, and a third protocol, respectively. Ones of these protocols may comprise, for example, Border Gateway Protocol (BGP), Spanning Tree Protocol (STP), Link Layer Discovery Protocol (LLDP), Address Resolution Protocol (ARP), and Simple Network Protocol (SNP). First protocol, second protocol, and third protocol are not limited to the aforementioned protocols and may comprise any protocols that network device 110 is capable of using.

Computing device 140 may comprise an engine (e.g., analytics engine) that may run in the control plane of network device 110. Computing device 140 may parses packets that traverse first port 135 and create, based on the parsed packets, metrics for each of plurality of hosts 105 on a per-protocol basis. Computing device 140 may be described in greater detail below with respect to FIG. 3.

Figure 2:
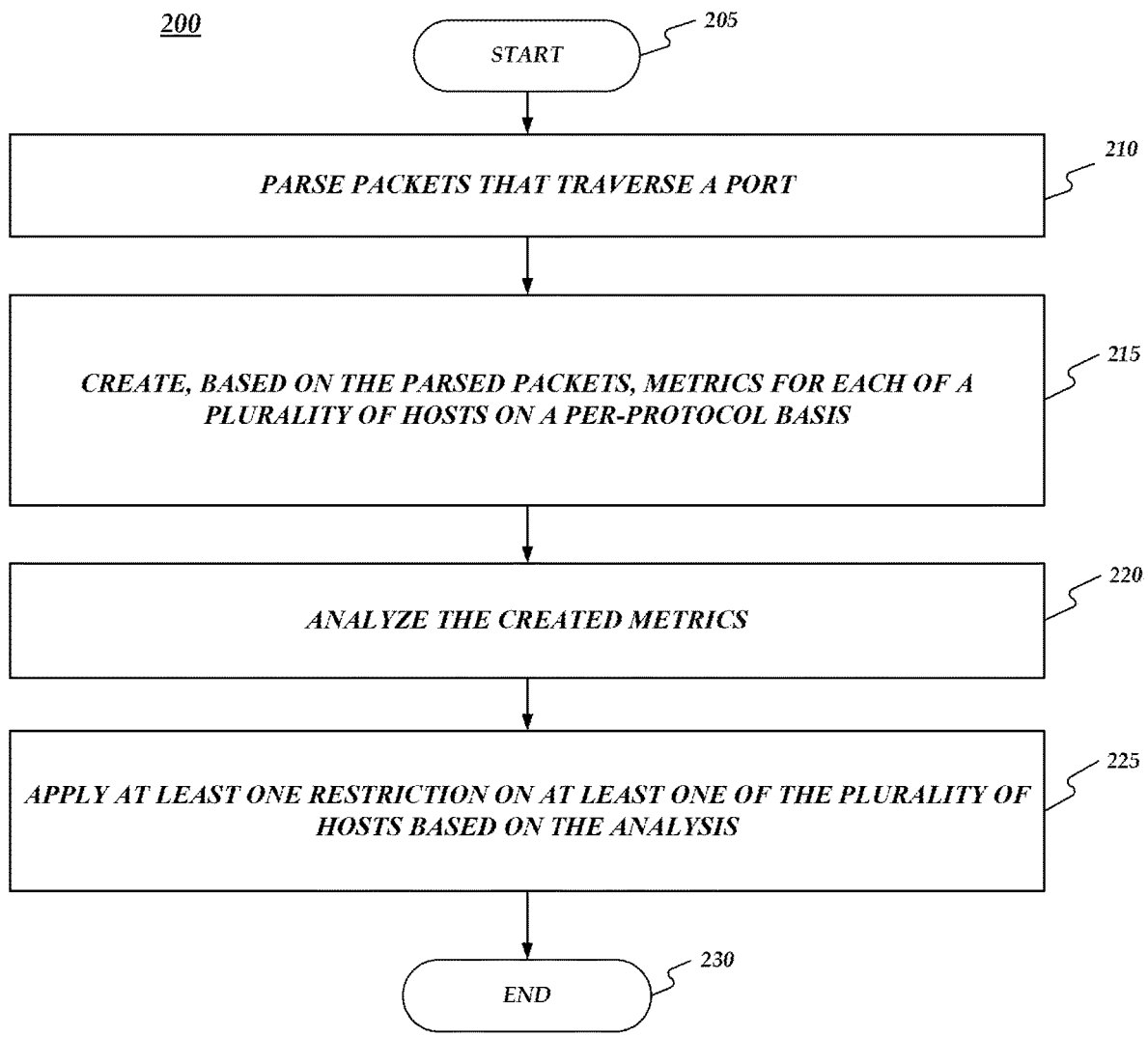
FIG. 2 is a flow chart of a method for providing control plane analytics and policing.

FIG. 2 is a flow chart setting forth the general stages involved in a method 200 consistent with an embodiment of the disclosure for providing control plane analytics and policing. Method 200 may be implemented using computing device 140 as described above with respect to FIG. 1 and in more detail below with respect to FIG. 3. Ways to implement the stages of method 200 will be described in greater detail below.

Method 200 may begin at starting block 205 and proceed to stage 210 where computing device 140 may parse packets that traverse a port (e.g., first port 135). For example, plurality of first protocol hosts 120, plurality of second protocol hosts 125, and plurality of third protocol hosts 130 may communicate through first port 135 of network device 110 using a first protocol, a second protocol, and a third protocol, respectively. Computing device 140 may comprise an analytics engine that that may run in the control plane of network device 110. Control plane traffic at first port 135 (i.e., both transmit and receive) may be directed by network device 110 to pass through computing device 140 on network device 110. Computing device 140 may parses the packets that traverse first port 135.

From stage 210, where computing device 140 parses the packets that traverse first port 135, method 200 may advance to stage 215 where computing device 140 may create, based on the parsed packets, metrics for plurality of hosts 105 on a per-protocol basis. Computing device 140 may build analytics database 115 that involves "states" at each protocol level as well as at each host level within that protocol. For example, one of the metrics that may be maintained in these states may comprise, for example, the frequency of handshakes in a given protocol (e.g., ARP) rate from any given host that is terminating on network device 110. In other words, computing device 140 may parse the packets that traverse first port 135, determine that the protocol for plurality of first protocol hosts 120 (i.e., the first protocol) is ARP, and monitor in analytics database 115 the arping (i.e., ARP) rate of plurality of first protocol hosts 120. Arping may comprise a computer software tool for discovering and probing hosts on a computer network. Arping may probe hosts on the attached network link by sending Link Layer frames using ARP request method addressed to a host identified by its Media Access Control (MAC) address of the network interface. The aforementioned is an example and computing device 140 may monitor more than the arping of plurality of first protocol hosts 120.

The number of states created and maintained by computing device 140 may be a function of how many hosts are communicating with the control plane of network device 110 and how many protocols are enabled in network device 110. Creating the metrics for plurality of hosts 105 on the per-protocol basis may comprise profiling states of plurality of hosts 105 on a per-protocol basis. The profiled states may comprise, but are not limited to, bandwidth, frequency, and burst. Other profiled states (e.g., control plane metric states) that may be monitored may comprise, but are not limited to: transmit/receive Packet-count, transmit/receive Byte-count, transmit/receive Packet-rate, transmit/receive Byte-rate, transmit/receive Min PDU-length, transmit/receive Max PDU-length, transmit/receive Avg PDU-length, transmit/receive Min Protocol-Hello-Frequency, transmit/receive Max Protocol-Hello-Frequency, transmit/receive Avg Protocol-Hello-Frequency, transmit/receive Max Routes-per-PDU, transmit/receive Avg Routes-per-PDU, transmit/receive IP-Fragmented packets, and transmit/receive TCP-Retransmits.

Once computing device 140 creates the metrics in stage 215, method 200 may continue to stage 220 where computing device 140 may analyze the created metrics. Thresholds may be maintained for each of the protocol handshakes at each host level so that a given host's traffic behavior may be proactively monitored in real-time. For example, if a traffic storm (e.g., ARP storm) is experienced by network device 110 from plurality of first protocol hosts 120, computing device 140 may be able to determine which one or ones of plurality of first protocol hosts 120 may be above the maintained threshold and thus may be the cause of the traffic storm. Accordingly, computing device 140 may analyze the created metrics not only on a per-protocol basis, but also on an even more granular level by looking at individual hosts within the protocol.

After computing device 140 analyzes the created metrics in stage 220, method 200 may proceed to stage 225 where computing device 140 may apply at least one restriction on at least one of plurality of first protocol hosts 120 based on the analysis. For example, the aforementioned proactive monitoring by computing device 140 may enable the control plane to install a more strict control plane protection policy dynamically for the specific host or hosts within a given protocol that may be causing the aforementioned traffic storm. In the above example, computing device 140 may determine and identify that one of plurality of first protocol hosts 120 is handshaking (i.e., ARPing) at a frequency above a predetermined threshold. Accordingly, this identified one of plurality of first protocol hosts 120 may be rate limited or completely ignored by network device 110 in response to the more strict control plane protection policy. Embodiments of the disclosure are not limited to measuring protocol handshake rate and other characteristics of a given protocol may be monitored that can be captured and monitored in the respective states. Once computing device 140 applies the at least one restriction in stage 225, method 200 may then end at stage 230.

An embodiment consistent with the disclosure may comprise a system for providing control plane analytics and policing. The system may comprise a memory storage and a processing unit coupled to the memory storage. The processing unit may be operative to parse packets that traverse a port and create, based on the parsed packets, metrics for each of a plurality of hosts on a per-protocol basis. The processing unit may be further operative to analyze the created metrics and apply at least one restriction on at least one of the plurality of hosts based on the analysis.

Figure 3:
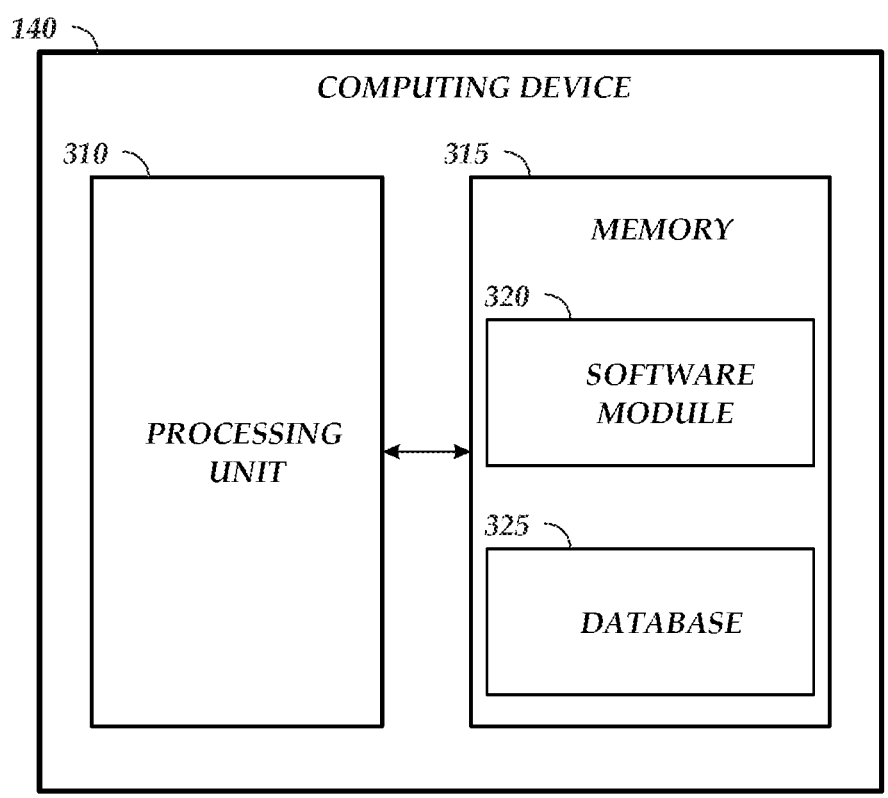
FIG. 3 shows a computing device.

FIG. 3 shows computing device 140. As shown in FIG. 3, computing device 140 may include a processing unit 310 and a memory unit 315. Memory unit 315 may include a software module 320 and a database 325. While executing on processing unit 310, software module 320 may perform processes for providing control plane analytics and policing, including, for example, any one or more of the stages from method 200 described above with respect to FIG. 2.

Computing device 140 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a network switch, a router, or other similar microcomputer-based device. Computing device 140 may comprise any computer operating environment, such as handheld devices, multiprocessor systems, microprocessor-based or programmable sender electronic devices, minicomputers, mainframe computers, and the like. Computing device 140 may also be practiced in distributed computing environments where tasks are performed by remote processing devices. The aforementioned systems and devices are examples and computing device 140 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    parsing packets that traverse a port of a switch device;
    creating, based on the parsed packets, metrics for each of a plurality of hosts on a per-protocol basis on the switch device, wherein creating the metrics for each of the plurality of hosts comprises profiling states of each of the plurality of hosts on the per-protocol basis at each protocol layer and at a host level within the each protocol layer, wherein profiling the states of each of the plurality of hosts on the per-protocol basis at the each protocol layer and the host level within each protocol layer comprises maintaining a frequency of handshakes in a given protocol from a given host that is terminating on the switch device, wherein creating the metrics further comprising publishing, by the switch device, the metrics via spanned-packets to an external device that is in a path of the port in at least one of the following modes: a pull based mode, a timer based push mode, and event based push mode, and wherein publishing the metrics further comprises publishing the metrics for a selected protocol at pre-determined time period;
    analyzing the created metrics; and
    applying at least one restriction on at least one of the plurality of hosts based on the analysis.

2. The method of claim 1, wherein parsing the packets that traverse the port comprises parsing the packets that traverse the port on a network device comprising one of the following: a switch and a router.

3. The method of claim 1, wherein the profiled states comprise one of the following: bandwidth; frequency; and burst.

4. The method of claim 1, wherein creating the metrics for each of the plurality of hosts on the per-protocol basis comprises creating the metrics comprising at least one of the following: a transmit/receive packet count and a transmit/receive packet rate.

5. The method of claim 1, wherein creating the metrics for each of the plurality of hosts on the per-protocol basis comprises creating the metrics comprising at least one of the following: a transmit/receive byte count and a transmit/receive byte rate.

6. The method of claim 1, wherein creating the metrics for each of the plurality of hosts on the per-protocol basis comprises creating the metrics comprising at least one of the following: a transmit/receive minimum protocol data unit (PDU) length; a transmit/receive maximum PDU length; and a transmit/receive average PDU length.

7. The method of claim 1, wherein creating the metrics for each of the plurality of hosts on the per-protocol basis comprises creating the metrics comprising at least one of the following: a transmit/receive minimum Protocol-Hello-Frequency; a transmit/receive maximum Protocol-Hello-Frequency; and a transmit/receive average Protocol-Hello-Frequency.

8. The method of claim 1, wherein creating the metrics for each of the plurality of hosts on the per-protocol basis comprises creating the metrics comprising at least one of the following: a transmit/receive maximum Routes-per-Protocol Data Unit (PDU) and a transmit/receive average Routes-per-PDU.

9. The method of claim 1, wherein creating the metrics for each of the plurality of hosts on the per-protocol basis comprises creating the metrics comprising transmit/receive Internet Protocol (IP)-fragmented packets.

10. The method of claim 1, wherein creating the metrics for each of the plurality of hosts on the per-protocol basis comprises creating the metrics comprising transmit/receive Transmission Control Protocol (TCP)-retransmits.

11. The method of claim 1, wherein applying the at least one restriction on the at least one of the plurality of hosts based on the analysis comprises applying the at least one restriction comprising limiting a rate of the at least one of the plurality of hosts.

12. The method of claim 1, wherein applying the at least one restriction on the at least one of the plurality of hosts based on the analysis comprises applying the at least one restriction comprising ceasing communications with the at least one of the plurality of hosts for a predetermined time period.

13. A non-transitory computer-readable medium that stores a set of instructions which when executed perform a method executed by the set of instructions comprising:
    parsing packets that traverse a port of a network switch;
    creating, based on the parsed packets, metrics for each of a plurality of hosts on a per-protocol basis, wherein profiling the states of each of the plurality of hosts on the per-protocol basis at the each protocol layer and the host level within each protocol layer comprises maintaining a frequency of handshakes in a given protocol from a given host that is terminating on the switch device, wherein creating the metrics further comprising publishing, by the network switch, the metrics via spanned-packets to an external device that is in a path of the port in at least one of the following modes: a pull based mode, a timer based push mode, and event based push mode, and wherein publishing the metrics further comprises publishing the metrics for a selected protocol at pre-determined time period;
    analyzing the created metrics; and applying at least one restriction on at least one of the plurality of hosts based on the analysis.

14. The non-transitory computer-readable medium of claim 13, wherein creating the metrics for each of the plurality of hosts on the per-protocol basis comprises profiling states of each of the plurality of hosts on a per-protocol basis wherein the profiled states comprise one of the following: bandwidth; frequency; and burst.

15. The non-transitory computer-readable medium of claim 13, wherein applying the at least one restriction on the at least one of the plurality of hosts based on the analysis comprises applying the at least one restriction comprising limiting a rate of the at least one of the plurality of hosts.

16. The non-transitory computer-readable medium of claim 13, wherein applying the at least one restriction on the at least one of the plurality of hosts based on the analysis comprises applying the at least one restriction comprising ceasing communications with the at least one of the plurality of hosts for a predetermined time period.

17. An apparatus comprising:
a memory storage; and
a processing unit coupled to the memory storage, wherein the processing unit is operative to:
parse packets that traverse a port of a network switch;
create, based on the parsed packets, metrics for each of a plurality of hosts on a per-protocol basis on the network switch, wherein the processing unit being operative to create the metrics for each of the plurality of hosts comprises the processing unit being configured to profile states of each of the plurality of hosts on the per-protocol basis at each protocol layer and at a host level within the each protocol layer, wherein the processing unit being operative to profile the states of each of the plurality of hosts on the per-protocol basis at the each protocol layer and the host level within each protocol layer comprises the processing unit being operative to maintain a frequency of handshakes in a given protocol from a given host that is terminating on the switch device, and wherein the processing unit being operative to create the metrics further comprise the processing unit being operative to publish the metrics via spanned-packets to an external device that is in a path of the port in at least one of the following modes: a pull based mode, a timer based push mode, and event based push mode, and wherein the processing unit being operative to publish the metrics further comprises the processing unit being operative to publish the metrics for a selected protocol at pre-determined time period;
analyze the created metrics; and
apply at least one restriction on at least one of the plurality of hosts based on the analysis.

18. The apparatus of claim 17, wherein the processing unit being operative to create the metrics for each of the plurality of hosts on the per-protocol basis comprises the processing unit being operative to profile states of each of the plurality of hosts on a per-protocol basis wherein the profiled states comprise one of the following: bandwidth; frequency; and burst.

19. The apparatus of claim 17, wherein the processing unit being operative to apply the at least one restriction on the at least one of the plurality of hosts based on the analysis comprises the processing unit being operative to apply the at least one restriction comprising limiting a rate of the at least one of the plurality of hosts.

20. The apparatus of claim 17, wherein the processing unit being operative to apply the at least one restriction on the at least one of the plurality of hosts based on the analysis comprises the processing unit being operative to apply the at least one restriction comprising ceasing communications with the at least one of the plurality of hosts for a predetermined time period.

* * * * *